May 27, 1952     A. S. JONES ET AL     2,598,264
METHOD OF APPLYING A DISCONTINUOUS COATING TO FABRIC
Filed March 19, 1949

Inventors
Albert S. Jones
Gerald B. Stackpole
By Clayton L. Jenks
Attorney

Patented May 27, 1952

2,598,264

UNITED STATES PATENT OFFICE 2,598,264

METHOD OF APPLYING A DISCONTINUOUS COATING TO FABRIC

Albert S. Jones, Webster, and Gerald B. Stackpole, Oxford, Mass., assignors, by mesne assignments, to Joseph Bancroft & Sons Company, Rockford, Wilmington, Del., a corporation of Delaware Application March 19, 1949, Serial No. 82,366

1 Claim. (Cl. 117—38)

This invention relates to a polished cloth of high lustre which is permanent to washing and a method of making the same.

A glazed chintz has been made, according to the U. S. Patent to Lippert, No. 2,148,316, by impregnating a cotton cloth with a polymerizable urea formaldehyde resin, then partially drying the cloth and polishing it and hardening the resin. In that process, the fabric is fully immersed in the resin solution and then squeezed through a padder, so that the resin impregnates the cloth substantially throughout the woven yarn, as indicated in Fig. 3 of the drawing. In order to localize the resin to the top surface, as proposed in the patent to DeGoencz et al., U. S. No. 2,185,746, a temporary starch filler or repellant is initially incorporated in the cloth and, after drying, the cloth is polished. Then the filled and polished cloth is coated with a viscous polymerizable resin and the surplus scraped off by means of a doctor blade. The coating is a substantially continuous film, as indicated in Fig. 4 of the drawings, after polymerization has been completed and the repellant has been washed out. Hence, the cloth is passed through a breaker unit to break up the surface coating and soften the fabric. The multistage technique involved in making such a chintz is complex and expensive, whereas it is desirable to provide a simple method of providing and stabilizing a polished appearance.

In spite of such attempts at limiting the depth of coating, the resin not only impregnates the surface portions of the woven threads but to a large extent forms a continuous film from one thread to the next or across the openings between the woven threads. The resin stiffens the cloth because of that surface coating and its penetration into the body of the thread; and the chintz cloth has only a limited utility and cannot be used for ordinary lightweight garments requiring an open porous weave or where the material is subjected to serious usage that forms creases and wrinkles. The continuous resin coating impairs the cloth and makes it likely to crack and tear, and it prevents the passage of air as is needed in many garments where porosity is paramount.

The primary object of this invention is to overcome such disadvantages and to provide a glazed cloth having only the outer surface of the threads treated with a resin, which, after polishing and setting, will not cause the cloth to crack or tear to a material extent under normal usage but will permit the cloth to be used normally as a garment having a required porosity, hand and softness and other needed garment characteristics.

Another object is to provide a simple and economical method of making a glazed cloth of general utility. Other objects will be made apparent in the following disclosure.

In accordance with this invention, a polished cloth of desired garment characteristics is made by applying a polymerizable resin, preferably by printing, to only the top surface portions of the threads that form the outer face of the cloth and not in the weave spaces between the threads. The surface fibres are held immobilized in a polished or glazed condition by polymerization of the resin. The thread portions and fibres on the back of the cloth and in the spaces of the weave are not immobilized by the resin, and thus the major portion of the cloth retains its normal characteristics and functions; and the cloth has substantially the same qualities which it would have without the resin treatment except that the outer surface fibres of the threads are held permanently polished.

The drawings illustrate diagrammatically and in exaggerated form the major distinctions between a resin printed cloth and a cloth coated by immersion in a resin solution.

In order to obtain a permanent luster, a printing paste containing a polymerizable resin condensation product is applied only to the surface portions of the threads which are to carry the polish. To prevent the resin paste from penetrating the pore spaces or the body of the individual threads to any material extent, the printing paste is applied locally and preferably by means of a printing roller having an intaglio engraving on its surface which provides minute intaglio lines, dots or other surface markings for carrying the resin paste. The intaglio grooves are so shallow and narrow that the printing roller is unable to make more than a minute application of the resin and on just the outer surfaces of the threads which contact the roller.

The preferred forms of printing roller are those known as a pin roller and a line roller. These printing rollers are made by pressing a mill having projecting pins or ridges into the face of a copper surfaced roll. That is, the mill may be made by etching and milling with steel dies which form a series of parallel minute raised lines on the surface of the mill roll. If these lines are cut in a checkerboard pattern, this forms square pins which in turn form square sided depressions in the copper roll, or a reverse or intaglio recess intended to carry the resin or printing fluid. The line roller may have its parallel lines arranged diagonally relative to the roll axis, and these lines are separated by extremely fine, shallow and narrow grooves below the cylindrical surface of the roll. So fine are the pin and line impressions that each of these indented surfaces feels smooth to the touch of one's hand, and a doctor blade may readily scrape all of the excess resin paste from the outer surface of the roll prior to the printing operation, so that the only paste remaining on the roll must lie in the intaglio depressions. The line, or pin formations on the printing roll are normally provided with from 75 to 90 lines per linear inch, and the recess for carrying the resin paste is ordinarily not over about 0.003 or 0.004 inch in depth, so that the amount of resin which each engraved depression can apply to the cloth is extremely minute. These types of roller are not serviceable for the standard cloth printing operations, because of their inability to carry sufficient printing ink.

Figure 1:
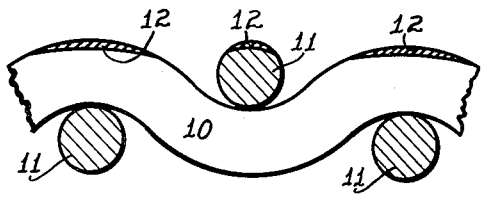
Fig. 1 is a sectional view through a woven piece of unglazed cloth showing the resin on the top surfaces of the threads.

If a suitable resin paste is printed on dyed, pattern printed or plain cloth by such a pin or line roller, after the excess of paste has been scraped from the periphery of the roller so that only that which lies within the very shallow recesses can be applied to the cloth, the result is that this slight amount of resin is transferred only to the outer contact surfaces of the threads and not enough resin is left to strike around the sides of the threads and into the pore or weave spaces of the cloth. The resin paste has such a composition that it penetrates the surface fibres of the individual threads and, after glazing and setting, immobilizes them, but there is not enough resin present to penetrate deeply enough into the thread to stiffen it materially. As shown in Fig. 1, the cloth comprising a warp 10 and weft 11 is so printed that the resin 12 penetrates only the top portions of the threads and is thus localized in isolated areas of the fabric.

The immobilizing paste comprises a potentially reactive polymerizable condensation product capable of being hardened and preferably by heating to a permanent thermoset condition. The preferred paste comprises melamine formaldehyde or its homologs incorporated with a thickener, such as starch or sodium alginate, and proportioned to give the required viscosity and composition. Other suitable resins may be employed, such as the amino-plasts, the amide formaldehyde condensation products, and the condensation products of formaldehyde with urea, subject to required modifications of the procedure. The preferred melamine formaldehyde polymerizable condensation product is formed by combining 1.5 molecular parts of formaldehyde with one part of melamine in alkaline solution. This methylol melamine resin hardens by further condensation when heated.

A suitable printing paste may be made of 15 gallons of melamine formaldehyde and 85 gallons of a 2% aqueous solution of sodium alginate. Color may be added if desired. A paste may be made by cooking 0.75 pound of corn starch in 1 gallon of water. Seventy-five parts by weight of that corn starch is combined with 15 parts by weight of melamine formaldehyde. To this mixture is added 10 parts by weight of a 10% solution of ammonium chloride in cold water, this salt serving as a catalyzer for polymerization of the resin. The starch or sodium alignate is a thickener employed to give a desired consistency to the printing paste, since the monomeric resin may be a heavy liquid and not usable alone without the thickener. Other thickeners may be employed, such as gum tragacanth or methyl cellulose. Urea formaldehyde may be employed in the proportion of 25 parts thereof to 75 parts of corn starch. Another printing composition may consist of 12 pounds of partially polymerized melamine formaldehyde in a viscous fluid condition mixed with 9 pounds of melamine formaldehyde as a partially polymerized powder. This is combined with 6 gallons of methyl cellulose (5 ounces per gallon) and 0.5 gallon of sulphonated castor oil and incorporated with 4 ounces of NH4Cl accelerated in a solution of 2 gallons of water. Various other resin pastes may be used.

The monomeric or partially polymerized melamine formaldehyde resin is preferred, since the cloth may be dried after the printing operation and before polishing, without polymerizing the resin materially. That is, it is not necessary to control the moisture content, but the cloth may be dried substantially fully, depending on the daily changes in atmospheric humidity. Hence, after the cloth has been printed with the resin paste, it may be dried to substantially a dry condition in which there is usually not over 5% of moisture or to such a condition that the paste will not mark off or smear materially during the subsequent calendering polishing operation.

Figure 2:
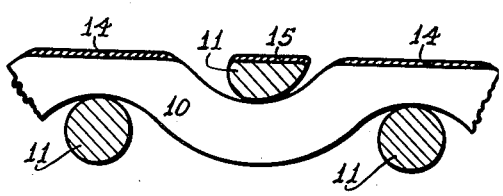
Fig. 2 is a similar view showing that the upper surfaces of the threads have been crushed and polished.

The cloth may be friction calendered after the resin printing step at a temperature of 320 to 400° F. without polymerizing the resin materially, provided the cloth is passed through the polishing zone rapidly. The friction calendering may be accomplished in accordance with standard procedure by passing the cloth through calendering rolls under suitable pressure which may be as high as 40 tons, and one or both rolls may be heated to the required temperature. The upper calendering roll may be a heated steel roll driven faster than a lower husk roll, so that there is a friction slippage of the higher speed roll against the resin treated surface of the cloth. The rate of movement of the cloth is controlled by supplemental driven rollers or a drum. This polishing operation by the heated steel roll serves to crush the threads and fibres on the upper resin treated surfaces, as indicated in Fig. 2, and to cause the fibres or nap to lie substantially in one direction and present the smooth light-reflecting surfaces 14 and 15. If an untreated cloth is friction glazed and then washed, the glaze will disappear. That is why the resin is employed. It penetrates the fibres and, after crushing or polishing and immobilization by curing, the glazed condition persists and is permanent to washing.

Polymerization may be effected either during the friction polishing or subsequently, as by passing the cloth through a heated chamber or over a heated drum or between heated rolls which provide the required temperature condition, such as 300° F. to 325° F. for 5 to 25 minutes. There is wide latitude as to the temperature since polymerization is a function of the time during which the cloth is heated. It is preferred to combine the calendering and polymerizing operations by friction calendering at 320 to 400° F., since the potentially reactive melamine formaldehyde condensation product tends to flow slightly under the pressure of the calendering rolls and so be forced into intimate contact with the surface fuzz of the top portions of the threads. This aids in immobilizing the glaze.

It will be appreciated that various procedures may be adopted for the preliminary and final treatments of the cloth. In one preferred practice, a strip of cotton fabric of suitable weave may be preliminarily treated as by a standard bleaching procedure. The bleached cloth may be dried and framed to provide the required width and then dyed, if desired, with a suitable color. If desired, the cloth, whether dyed or not, may be first printed with a required printing ink pattern and then aged and otherwise treated to fix the printing dye stuff. The cloth may be washed with soap, dried and framed, thus leaving it ready for the resin paste printing operation.

After any desired preliminary treatment, the cloth is printed with the very thin coating of resin paste by means of a pin or line roller as above defined; and this may be accomplished in the standard printing machine under a suitable printing pressure, in which a single printing roll is supplied with the paste. After drying, the cloth is passed through the heated friction calendering rolls, which serve to crush the top of the cloth and force the nap or surface fibres to become flat and lie primarily in one direction and present the desired glaze or sheen. After the resin has been cured, the cloth may be subjected to various types of operations, such as washing with soap to remove the residual chemicals heretofore employed or to remove the glaze in the unprinted portions, if the resin was printed in a pattern. The cloth may then be framed and dried and, if desired, subjected to sanforizing or other treatment, such as a slack laundering operation, wherein the cloth is shrunk to substantially its final size. The printed cloth does not display a saturation or water repellancy which would interfere with the shrinkage or sanforizing treatment.

As an indication of the amount of resin applied by the pin or line roller, the standard operation for forming a chintz by immersion requires one gallon of resin solution for a yardage of 50 yards of 36-inch cotton having 80 threads per linear inch, whereas a pin printing roll having 90 lines per linear inch will print from 270 to 300 yards per gallon of the resin paste. For other weaves of cotton cloth, this new procedure will print from 200 to 400 yards. As a further example, 4 yards of cotton fabric were coated by immersion padding at the rate of 50 yards per gallon in a liquor weighing about the same as water, and the absorption was found to be 66%; whereas the absorption resulting from printing with a 90 line blotch was 12%. At least 200 yards of 80-80 cotton cloth are to be printed by one gallon of the melamine formaldehyde printing paste to obtain a cloth which would be suitable for use as pajamas or like goods. That is, this method usually requires from one fifth to one sixth of the resin which has heretofore been used for making a standard lightweight and very flexible chintz. It will also be noted that the quantity of resin may be varied. To obtain more drapiness and less lustre, one may use a finer engraved roll and print less resin on the cloth threads.

The drawings illustrate the major differences between a chintz and the new type of cloth. The views of Figs. 1 to 4 are necessarily diagrammatic and in exaggerated form, because the thread is not a single cylindrical body but is composed of innumerable fine fibres intermatted and twisted together. However, when the woven cloth made up of the warp 16 and weft 17 (Fig. 3) is resin treated by the immersion process, the polymerizable synthetic resin solution penetrates the threads from all sides and substantially fills the threads, as indicated by the dotted-line cross hatching. At the contact areas of the threads, the resin builds a deposit 18 in the pore spaces and tends to form a continuous resin film thereacross. If a starch filler is incorporated in the cloth before coating it with a resin paste, the coating 19 (Fig. 4) resides primarily on the surface of the cloth, although the resin paste penetrates the fibres somewhat. The coating is substantially continuous at 18 across the pore spaces of the wave and so tends to immobilize the cloth structure.

Figure 3:
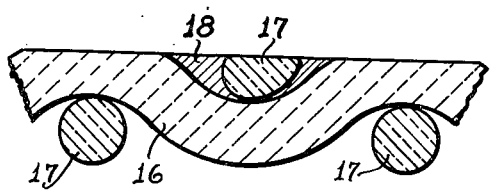
Fig. 3 shows in comparison a glazed chintz which has been resin treated by immersion.
Figure 4:
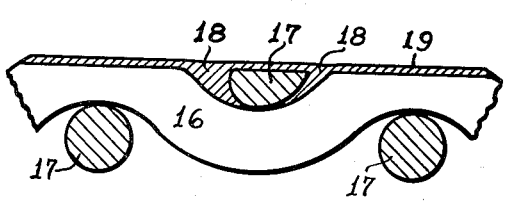
Fig. 4 is a similar view of a chintz made by immersion in a resin solution after a filler has been incorporated in the cloth to prevent complete penetration.

Fig. 1 shows the location of the resin on the cloth printed in accordance with the present invention. If an unpolished woven cloth comprising the warp 10 and the weft 11 is printed by a pin roller, the paste containing the polymerizable synthetic resin will penetrate only the uppermost surface portions of the fibres of the weave which are forced into contact with the pin roller. The quantity of resin paste is so small that it cannot penetrate the thread deeply, and it remains only as layers 12 within the surface nap portions of the threads. Hence, the resin is not present at the contact areas of the contiguous warp and weft and the deposit 18 of Figs. 3 and 4 is absent. In particular, the resin areas 12 are localized and do not contact but are widely separated by the spaces in the weave. Hence, the cloth has substantially its original flexibility as well as permeability to light, air and water.

Figure 5:
Fig. 5 is a photomicrograph under transmitted light of a piece of bleached cotton cloth.
Figure 6:
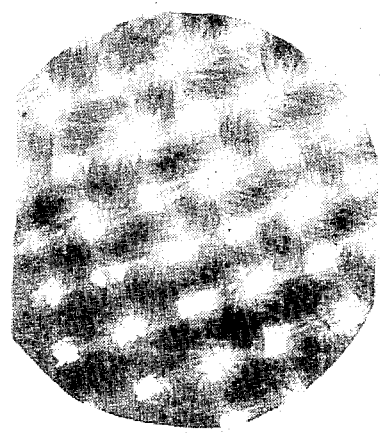
Fig. 6 is a similar photomicrograph of a cloth piece of the same weave after it has been resin printed and polished according to this invention.

Fig. 2 gives a diagrammatic view of the general shape of the threads and the location of the resin after the cloth has been polished by the high pressure rolls, the top one being smooth and heated and the lower being covered with cotton or shaped as a husk roll. This pressure treatment crushes the top surfaces of the cloth and particularly where the layer of resin resides, as indicated by the flattened portions 14 and 15 of the warp and the weft. Because the quantity of resin is limited to that which can penetrate only the upper interstices between the fibres of the threads, the pressure merely flattens the tops of the threads and orients the surface nap into parallelism and thus gives the glazed or polished appearance, but it does not move the resin portions into contact and form a continuous coating. The resin remains in localized separate deposits within the tops of the threads and is not present in the pores of the weaves. This is illustrated in Figs. 5 and 6, which are photomicrographs respectively of a piece of bleached cotton cloth of 80 threads to the inch without any resin and of the same type of cloth which has been resin printed, glazed and cured according to this invention. The surface fibres of the resin printed cloth of Fig. 6 are clearly visible and substantially to the same extent as those of the unprinted cloth of Fig. 5. The two samples have about the same light transmission, and both weaves have substantially the same sizes of pores or weave spaces for the passage of air and water, depending of course on the thread size and the closeness of the weave at the area of examination.

The printed cloth structure is, therefore, one in which the individual threads are left with substantially their entire flexibility, and the cloth will bend and move to about the same extent as before the application of the resin. Hence, it will drape readily and will serve about the same as if it had not been resin printed. A chintz with its comparatively thick layer or deposit of resin not only wrinkles seriously, but the coating may cause cracking and tearing under a light stress, because the threads are locked together by the excessive quantity of resin, and the cloth suppleness or flexibility is reduced to a serious extent. The resin print treatment is insufficient to render the cloth wrinkle or crease proof, since the internal structure of the cloth is not immobilized or affected materially. That is, the cloth will wrinkle normally about the same as the unprinted bleached cotton, and it can be treated as by an ironing operation to bring it back to its standard smooth condition. The resin application serves primarily to immobilize the lustre or sheen that is formed by calendering. The cloth has substantially its initial porosity and ability to transmit moisture and air, as is required for clothing worn close to the body, such as pajamas. This printing operation does not render the cloth stiff or harsh to the feel as is found where the cloth is treated in accordance with standard chintz making operations. The so-called hand of the cloth is altered only slightly. Its tensile strength is not affected because there is too little resin for the purpose.

Moreover, the advantages in this method will be apparent from the fact that the primary steps are merely printing with the resin paste, drying, glazing, curing and washing; whereas a surface coated chintz cloth may require filling the cloth with a removable starch, glazing, coating with resin, drying, glazing, curing, removing the starch and washing. The immersion process is likewise complex. Hence, our process has the economical advantage of simplicity.

It will be appreciated that various modifications may be made in the general procedure to obtain desired cloth characteristics. The above disclosure is, therefore, to be interpreted as setting forth the principles of this invention and the preferred practice and not as imposing limitations on the appended claim.

We claim:

A process for imparting a durable mechanical finish effect to a woven textile fabric which includes the steps of preparing a printing-paste consisting essentially of water, a water-soluble thermosetting textile resin in the water-soluble state, and a printing paste thickener in quantities to impart the viscosity hereafter specified; entraining the printing paste on a printing roll the pattern areas of which are traversed by a multiplicity of shallow grooves, the number of said grooves per inch in at least one direction being greater than the number of threads per inch in the fabric in the corresponding direction, said grooves further being not more than 0.004" in depth nor more than 0.0133" in width; removing substantially all of the printing paste from the external surface of the roll, and applying to one surface only of the fabric the discrete residua of printing paste contained in the grooves; and thereafter drying the fabric and calendering it with the application of sufficient heat to set the resin; the viscosity of the printing paste and the dimensions of the grooves being so proportioned that the residua will remain in the grooves until transferred to the fabric and will not thereafter strike around the sides of the threads and into the pore spaces of the fabric.

ALBERT S. JONES.
GERALD B. STACKPOLE.

REFERENCES CITED

The following references are of record in the file of this patent:

UNITED STATES PATENTS

| Number | Name | Date |
| --- | --- | --- |
| 2,148,316 | Lippert | Feb. 21, 1939 |
| 2,185,746 | DeGoencz | Jan. 2, 1940 |
| 2,249,088 | Murray | July 15, 1941 |
| 2,304,818 | Grupe | Dec. 15, 1942 |
| 2,446,864 | Abrams | Aug. 10, 1948 |
| 2,454,391 | Jones | Nov. 23, 1948 |